United States Patent
Jeong

(10) Patent No.: US 6,624,855 B1
(45) Date of Patent: Sep. 23, 2003

(54) SAFETY BAND FOR CATHODE RAY TUBE

(75) Inventor: Seong Han Jeong, Pusan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/550,174

(22) Filed: Apr. 14, 2000

(30) Foreign Application Priority Data

Apr. 15, 1999 (KR) .......................... 1999-13344

(51) Int. Cl.[7] .......................... H04N 5/65; H04N 5/645; H04N 5/64

(52) U.S. Cl. .................. 348/822; 348/825; 348/836

(58) Field of Search ................ 348/822, 825, 348/836

(56) References Cited

U.S. PATENT DOCUMENTS 4,415,932 A  11/1983  Rogers ................. 348/822
6,417,893 B1 *  7/2002  Heirich et al. ........... 348/822

FOREIGN PATENT DOCUMENTS

JP  62-020225  1/1978
JP  53-114345  10/1978

* cited by examiner

*Primary Examiner*—Chris Kelley
*Assistant Examiner*—Allen Wong
(74) *Attorney, Agent, or Firm*—Birch, Stewart, Kolasch & Birch, LLP

(57) ABSTRACT

The present invention relates to a safety band for a CRT which is capable of increasing a stability of use by enhancing an anti-explosion characteristic based on an optimum band size corresponding to each panel by engaging a safety band to a CRT in which a FCD or a panel obtained by expanding an effective screen is adapted. In a CRT(Cathode Ray Tube) including a panel having an outer flat surface and an inner surface having a certain curvature, and a safety band bent at a mold match line of a side wall portion of the panel and continuously surrounding a side wall portion of the panel in the lengthy direction, a CRT safety band according to the present invention satisfies an expression of inequality of $30.16(\%) \leq D/W \times 100 \leq 41.27(\%)$ where W represents the entire width, D represents a width from a front end portion in the width direction to the bent portion.

4 Claims, 13 Drawing Sheets

SAFETY BAND FOR CATHODE RAY TUBE

BACKGROUND OF THE INVENTION

1. Field of the Invention

The present invention relates to a safety band for a CRT(Cathode Ray Tube), and in particular to a safety band for a CRT which is capable of enhancing a stability of use by providing a straight line shape safety band having a reinforced anti-explosive characteristic for each panel in a cathode ray tube in which a flat type panel and an effective screen expanded panel, which attract a big attention, are adapted.

2. Description of the Background Art

The CRT(Cathode Ray Tube) is directed to a display apparatus which is widely used for a television set, an oscilloscope, a radar system, etc.

In the above-described cathode ray tube, there are provided fluorescent pixels which are a light emitting device for converting a received electrical image data into a visual data, and a graphite which is a light absorbing material. A color image which is reproduced by impacting an electronic beam onto a fluorescent film formed of an aluminum film for enhancing a luminance, so that a human can view a color image.

As shown in FIG. 1, the conventional CRT includes a panel 1 installed on a front surface, and a conical funnel 2 melted at a rear end of the panel 1 for thereby forming a vacuum container of a CRT.

An electron gun 5 is installed at an end portion having a small diameter among the portions of the funnel 2, namely, in the interior of a neck portion 3. A deflection yoke is installed at an outer portion near the neck portion 3 for deflecting the emitted electron beam 4 onto the whole portions of a screen by generating a fin cushion shaped horizontal deflection magnetic field and a barrel shaped vertical deflection magnetic field.

In addition, a fluorescent film 6 is formed on an inner surface of the panel 1, and a shadow mask 7 which operates for a function of a section-based electrode of the electron beam 4 at a certain distance from the fluorescent film 6 is stably engaged by a frame 8 installed therein.

In the above-described conventional cathode ray tube, the electron beam 4 outputted from the electron gun 5 is deflected onto a certain portion of the screen by the vertical and horizontal deflection magnetic fields and continuously passes through a plurality of through holes(not shown) formed at the shadow mask 7 and impacts the fluorescent film 6 for thereby implementing a certain image.

In addition, the interior of the conventional CRT has a vacuum state therein by the panel 1 and the funnel 2. A certain stress occurs at the panel 1 by an external atmospheric pressure. As shown in FIG. 2, a compression pressure occurs at the front surface of the panel based on the structural characteristic of the CRT, and a tension stress occurs at a side wall of the panel 1.

Therefore, in a state that the compression stress and the tension stress are formed based on the vacuum, when an external impact is applied to the CRT, a certain exploding phenomenon that the panel 1 or the funnel 2 is exploded may occur. The above-described exploding phenomenon cause a malfunction of the CRT and a user may be damaged.

Since the glass which is a material of the panel 1 is weak against a tension stress compared to the compression stress, the side wall of the panel 1 is weaker than the front portion of the same.

Here, the above-described exploding phenomenon is classified into four steps. The above-described steps will be explained with reference to FIG. 3D.

First, in a first step which is an initial crack forming step, when a certain portion of the CRT is impacted by an external impact source 10, as shown in FIG. 3A, a small crack occurs at the panel 1.

Namely, when the strength of the impact portion exceeds a certain level against the external impact source 10, a small crack occurs by the compression and tension stresses. The impact energy is spread over the CRT At this time, the crack grows at a structurally weal portion of the CRT or at a skirt which receives a concentrated stress.

In a second step which is a crack growing step, as shown in FIG. 3B, a crack "c" grows in the direction skirt of the panel 1, and the crack grows in a radial or conical shape.

The thusly formed creaks are grown over the entire portions of the CRT. At this time, the crack is increased more at the skirt portion to which the tension stress is applied, so that the skirt portion is expanded.

In a third step, as shown in FIG. 3C, the panel or the funnel 2 are depressed. The crack "c" is extended from the outer surface to the inner surface of the panel 1, so that the surface of the panel 1 or the funnel 2 is depressed.

As the skirt portion is expanded, the cracks are increased, and then a glass(the surface of the panel) is depressed due to a pressure difference between the inner and outer portions of the CRT.

In a fourth step, as shown in FIG. 3D, the particles are spread. When the CRT is inwardly depressed, a certain kinetic energy is generated, and the particles collide with each other, so that the particles are outwardly spread.

In a usual case, the surface portion is depressed, and then a certain impact is applied to the funnel 2, and at the final stage, the particles are spread.

As described above, since the exploding phenomenon causes a malfunction of the CRT or a certain damage to a user, so that a safety band 11 is used for preventing the above-described exploding phenomenon.

FIG. 4 is a view illustrating a comparison of the stress before and after the safety band is engaged to the CRT In FIG. 4, the left side illustrates a stress distribution before the safety band is engaged, and the right side illustrates a stress distribution after the safety band is engaged.

Namely, it is possible to enhance a strength of the lateral side by engaging the safety band to the side wall of the panel 1 for thereby preventing an exploding phenomenon.

In detail, when a certain impact is applied to the surface of the CRT a transform stress which expands the side wall portions of the panel 1, namely, a tension stress occurs. In this case, since the side wall portions of the panel 1 is compressed by the safety band 11, so that the cracks "c" which pass through the lateral sides and surfaces are prevented for thereby decreasing the speed of the crack "c".

As the safety band 11 is engaged, since a vacuum transformation stress affects the vacuum transformation stress, the direction of the main stress of the surface of the panel 1 is changed, and the growing direction of the crack "c" is changed for thereby preventing an explosion.

The safety band 11 surrounds a mold match line which is naturally formed when installing the panel 1. As shown in FIGS. 5A through 5C, the safety band 11 may be formed in a straight line shape 11a, an overlapped shape 11b, a bent shape 11c, etc.

The advantages and disadvantages of each of the safety band 11a, 11b and 11c are compared in the following Table 1.

TABLE 1

| | Straight line type | Overlapping type | Bent type |
|---|---|---|---|
| Anti-explosion characteristic | ○ | ○ | ⊚ |
| Processing characteristic | ⊚ | Δ | x |
| Unit cost | ⊚(1) | Δ(1.5~1.8 times) | x(more than 2.2 times) |
| Co-usability of band facility | ⊚(simple) | Δ(more complicated) | x(very complicated) |
| Welding method | Dot welding | Dot welding | Inverter welding |
| Use of welding plate | No | Yes | Yes |
| Cost of facility | ⊚(1) | Δ(1.5~2 times) | x(more than 2.5 times) |
| Productivity per day(29-inch) | ⊚(4800 units) | Δ(2400 units) | x(below 2000 units-estimated) | where
⊚ represents an excellent,
○ represents good,
Δ represents a common, and
x represents bad.

As shown in Table 1, in the case of the bent type band 11c, the anti-explosion characteristic is excellent. However, the bent type band 11c has a bad processing characteristic, a unit cost, a facility co-usability, a welding method, a welding plate use, a facility investment cost, a productivity per day, etc. compared to the other types. In the case of the straight line type band 11a, the above-described characteristics except for the anti-explosion characteristic is excellent.

Recently, the size of the screen is increased, the use of the flat type screen is increased. Therefore, a new type panel satisfying the above-described trends is introduced. As the new type panel, FIG. 6A illustrates a conventional panel, FIG. 6B illustrates a panel(FCD) 100 having a flat outer surface and a curved inner surface, and FIG. 6C illustrates a panel 200 obtained by increasing the size of the effective screen.

Namely, the FCD panel 100 is capable of providing a high resolution compared to the conventional curved type panel 1 for thereby implementing a refine resolution. The panel 200 obtained by increasing the size of the effective screen has an advantage in that it is possible to view a wider screen compared to the conventional panel even when the sizes of the panels are same.

However, the above-described FCD panel and the panel obtained by increasing the size of the effective screen have a low structural strength compared to the conventional curved panel for the reasons that the strength of the FCD panel is weak and has a large thickness difference between the center portion and the corner portion compared to the conventional panel and is weak against the thermal transformation stress with respect to the thermal expansion. In addition, in the panel formed by expanding the effective screen, the cornet portion of the panel must be designed to have a small curvature, so that the stress is concentrated at the corner portion, whereby the anti-explosion characteristic is decreased compared to the panel.

Therefore, it is preferred to install the safety band having an increased anti-explosion characteristic at the CRT in which the FCD panel or the panel formed by expanding the effective screen is adapted.

Namely, in the CRT in which the FCD or the panel formed by expanding the effective screen, an overlapping type band or bent type band which has a good anti-explosion characteristic compared to the straight line type band is preferably used. However, the overlapping type band or the bent type band has a disadvantage in that the processing ability, unit cost, facility co-usability, welding method, the use of welding plate, productivity per day, etc. are bad.

SUMMARY OF THE INVENTION

Accordingly, it is an object of the present invention to provide a safety band for a CRT which is capable of increasing a stability of use by enhancing an anti-explosion characteristic based on an optimum band size corresponding to each panel by engaging a safety band to a CRT in which a FCD or a panel obtained by expanding an effective screen is adapted.

It is another object of the present invention to provide a safety band for a CRT which is capable of enhancing a marketing compatibility of system by engaging a straight line shape safety band corresponding to the standard of UL/CSA.

It is another object of the present invention to provide a safety band for a CRT which has a low cost and high efficiency by using a straight line shape band.

To achieve the above objects, there is provided a CRT (Cathode Ray Tube) safety band which satisfies an expression of inequality of $30.16(\%) \leq D/W \times 100 \leq 41.27(\%)$ where W represents the entire width, D represents a width from a front end portion in the width direction to the bent portion in the CRT including a panel having an outer flat surface and an inner surface having a certain curvature, and a safety band bent at a mold match line of a side wall portion of the panel and continuously surrounding a side wall portion of the panel in the lengthy direction.

To achieve the above objects, there is provided a CRT (Cathode Ray Tube) safety band which satisfies an expression of inequality of $17.86(\%) \leq D/W \times 100 \leq 25.00(\%)$ where W represents the entire width, D represents a width from a front end portion in the width direction to the bent portion in the CRT which includes a panel having a curvature radius of below 4 mm of an inner surface diagonal portion which is a corner portion, and a safety band bent at a mold match line of a side wall portion of the panel and continuously surrounding a side wall portion of the panel in the lengthy direction.

BRIEF DESCRIPTION OF THE DRAWINGS

The present invention will become better understood with reference to the accompanying drawings which are given only by way of illustration and thus are not limitative of the present invention, wherein:

FIGS. 3A through 3D are views illustrating an explosion phenomenon of conventional CRT of which:

FIG. 3A is a view illustrating a first stage;

FIG. 3B is a view illustrating a second stage;

FIG. 3C is a view illustrating a third stage; and

FIG. 3D is a view illustrating a fourth stage;

FIGS. 5A through 5C are views illustrating a conventional safety band, of which:

FIG. 5A is a view illustrating a straight line type;

FIG. 5B is a view illustrating an overlapping type; and

FIG. 5C is a view illustrating a bent type;

FIGS. 6A through 6C are views illustrating various shapes of a conventional panel, of which:

FIG. 6A is a view illustrating a conventional panel;

FIG. 6B is a view illustrating a FCD panel; and

FIG. 6C is an exploded view illustrating an effective screen;

FIGS. 9A through 9E are views illustrating a crack growing pattern according to the present invention, of which:

FIG. 9A is a view illustrating a returning crack;

FIG. 9B is a view illustrating a 1/4 crack;

FIG. 9C is a view illustrating a 2/4 crack;

FIG. 9D is a view illustrating a 3/4 crack; and

FIG. 9E is a view illustrating a 4/4 crack;

FIGS. 10A through 10D are views illustrating a crack variation based on an entire width and bent portion width of a safety band in a FCD according to the present invention, of which:

FIG. 10A is a view illustrating a crack when an entire width is 63 mm, and a bent portion width is 15 mm;

FIG. 10B is a view illustrating a crack when an entire width is 63 mm, and a bent portion width is 19 mm;

FIG. 10C is a view illustrating a crack when an entire width is 63 mm, and a bent portion width is 22 mm~24 mm; and FIG. 10D is a view illustrating a crack when an entire width is below 55 mm, and a bent portion width is above 24 mm;

FIGS. 11A through 11D are views illustrating a crack variation based on an entire width and a bent portion width of a safety band in an effective screen expanded panel according to the present invention, of which:

FIG. 11A is a view illustrating a crack when an entire width is 60 mm, and a bent portion width is 8 mm;

FIG. 11B is a view illustrating a crack when an entire width is 60 mm, and a bent portion width is 10 mm and 11 mm;

FIG. 11C is a view illustrating a crack when an entire width is 60 mm, and a bent portion width is 12 mm; and FIG. 11D is a view illustrating a crack when an entire width is below 56 mm, and a bent portion width is 14 mm;

DETAILED DESCRIPTION OF THE PREFERRED EMBODIMENTS

Figure 1:
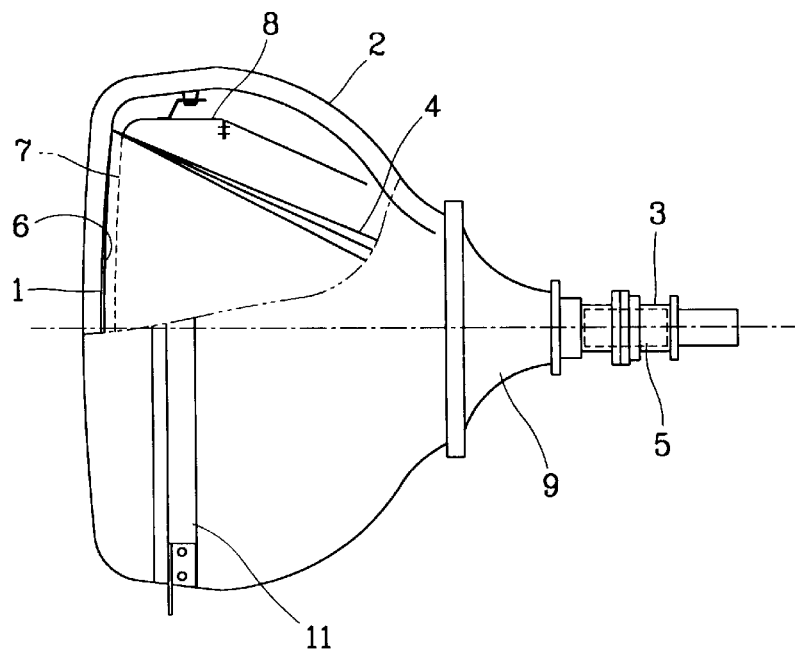
FIG. 1 is a view illustrating a conventional CRT.
Figure 2:
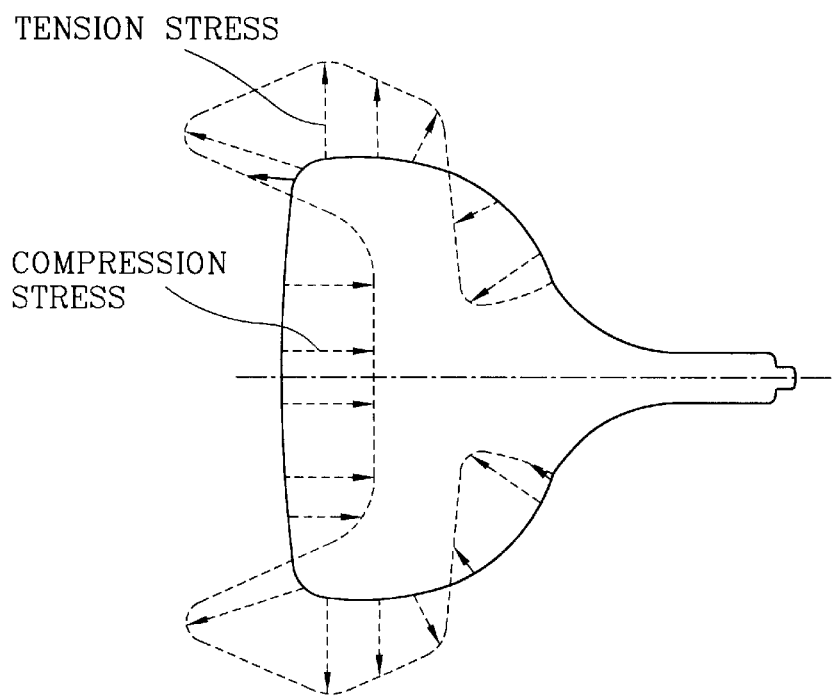
FIG. 2 is a view illustrating a stress distribution of a conventional CRT.
Figure 3A:
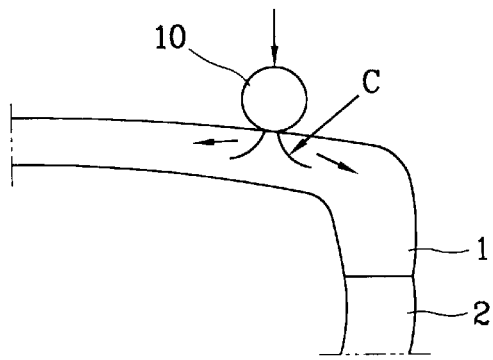
Figure 3B:
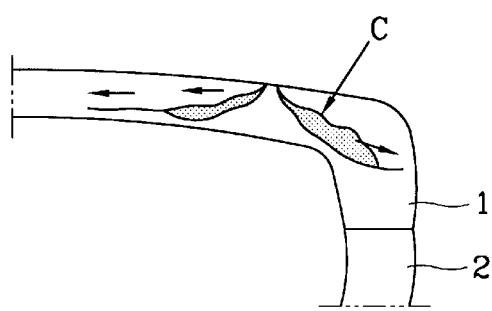
Figure 3C:
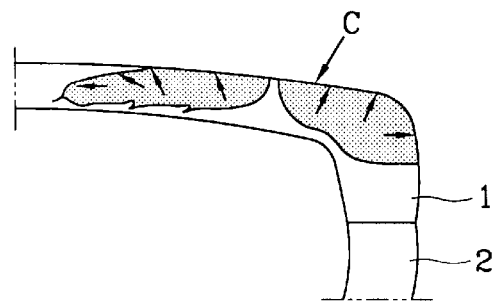
Figure 3D:
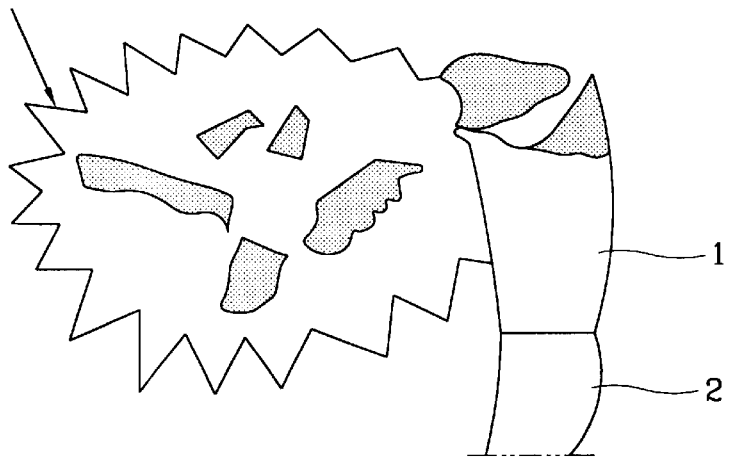
Figure 4:
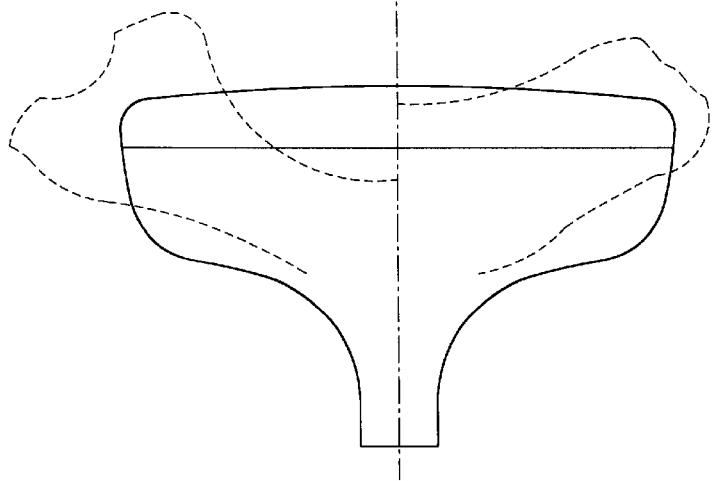
FIG. 4 is a view illustrating a stress comparison before and after a safety band is attached in a conventional CRT.
Figure 5A:
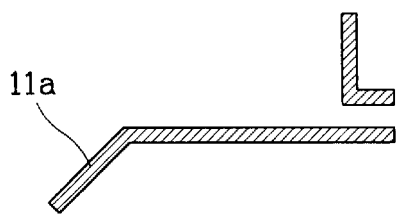
Figure 5B:
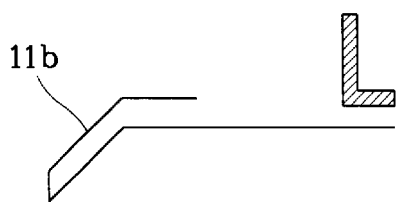
Figure 5C:
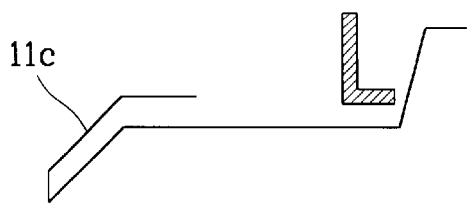
Figure 6A:
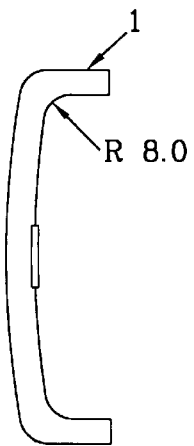
Figure 6B:
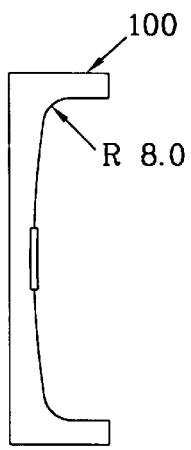
Figure 6C:
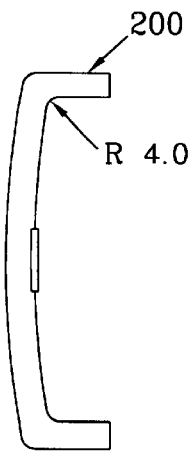

The band safety for a CRT(Cathode Ray Tube) according to the present invention will be explained with reference to the accompanying drawings. A plurality of embodiments may be adapted in the present invention. The most preferred embodiment will be described in detail as follows.

The same elements as the construction of FIGS. 1 through 6 will be given the same reference numerals, and the description of the same construction will be omitted.

The present invention is directed to providing an optimum safety band 101, 201 adapted to a FCD panel 100 or an effective screen expanded panel 200 which are recently being developed. The safety band 101, 201 which has a large engaging force is needed for a CRT in which the panels 100 and 200 are adapted.

Generally, an engaging force F is computed based on Equation F=σ×T×W(where σ represents a yield strength of a material, T represents a thickness of a safety band, and W represents a width of a safety band). Since the yield strength is generally determined by a fabrication company of a material, the engaging tensile force is determined based on the thickness and width of the safety band.

As shown in FIGS. 9A through 9E, the safety band 101, 201 is bent at a mole match line 102, 202 of a side wall portion of a panel 100, 200. The front portion has a front end tensile force and the rear portion has a rear end tensile force about the bent portion, respectively. The growing direction or size of the crack is determined based on the ration of the front and rear end tensile forces. Therefore, a ratio of the bent portion width(the width from the bent portion to the end portion of the front portion) with respect to the entire width of the safety band 101, 201 is important.

Many countries have a standard concerning the CRT Therefore, the CRT must be manufactured based on the above-described standard. As major standards, there are UL(USA), CSA(Canada), BSI(United Kingdom), VDE (Germany), JQA(Japan), SACI(China), etc.

Figure 7:
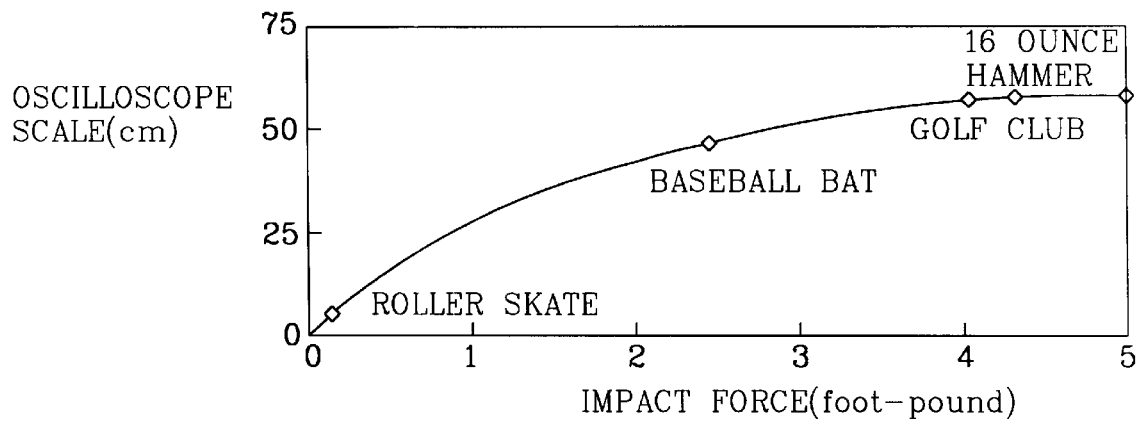
FIG. 7 is a graph illustrating an interrelationship between an impact energy and an impact effect according to an embodiment of the present invention.

FIG. 7 illustrates an interrelationship between an impact energy and an impact effect. In FIG. 7, the case that a unusual force is applied is adapted. Therefore, the safety is largely considered. In particular, the UL/CSA standard contains a standard for obtaining a stability of the CRT by preventing cracks even when a golf club is hit to the CRT using a possible largest impact force.

Therefore, the UL/CSA standard among the standards of many countries is very important for obtaining a stability of the CRT and a compatibility in the market of the CRT product.

The dimensions of the safety band 101, 201 adapted to the panel 100, 200 are optimized based on the above-described standards.

The optimization of the dimensions of the safety band 101 which is well adapted to the FCD panel 100 having an outer flat surface and an inner curved surface will be explained.

The glass of the CRT has an enough strength with respect to an external impact. The FCD panel 100 has many weak points compared to the conventional panel 1.

Namely, as shown in Table 2, the shape of the panel 100 is abnormal. Therefore, the strength of the same is low, and the structure of the thermal transformation stress due to the heat transformation is weak due to a thickness difference of the corner portion compared to the center portion of the panel 100. In addition, as shown in Table 3, the maximum stress during the vacuum state and the reinforcing operation is weak compared to the conventional panel 1.

TABLE 2

|  | Conventional panel | FCD panel | Max stress Increase (%) |
| --- | --- | --- | --- |
| Max stress after F/S | 51.40 Mpa | 62.30 Mpa | 21.21 |
| Max stress after ventilation | 63.20 Mpa | 69.40 Mpa | 9.81 |

TABLE 3

|  | Conventional panel | FCD panel | Max stress Increase (%) |
|---|---|---|---|
| Max stress in vacuum state | 79.11 Kgf/cm$^2$ | 87.77 Kgf/cm$^2$ | 10.95 |
| Max stress when reinforcing | 59.41 Kgf/cm$^2$ | 78.59 Kgf/cm$^2$ | 32.28 |

Figure 8:
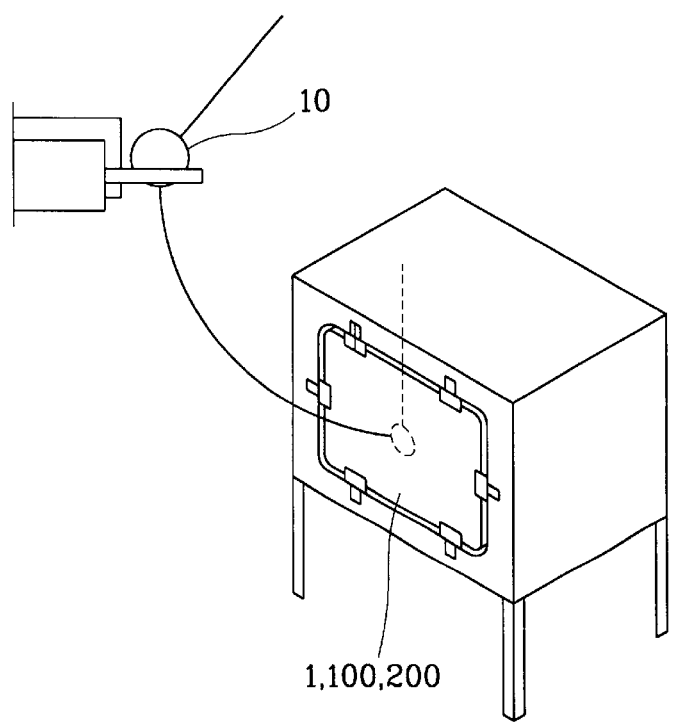
FIG. 8 is a view illustrating a panel ball impact test according to an embodiment of the present invention.
Figure 9A:
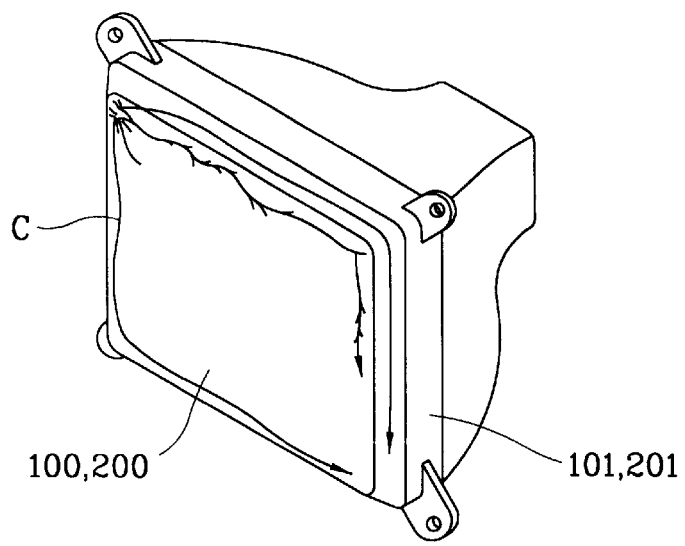
Figure 9B:
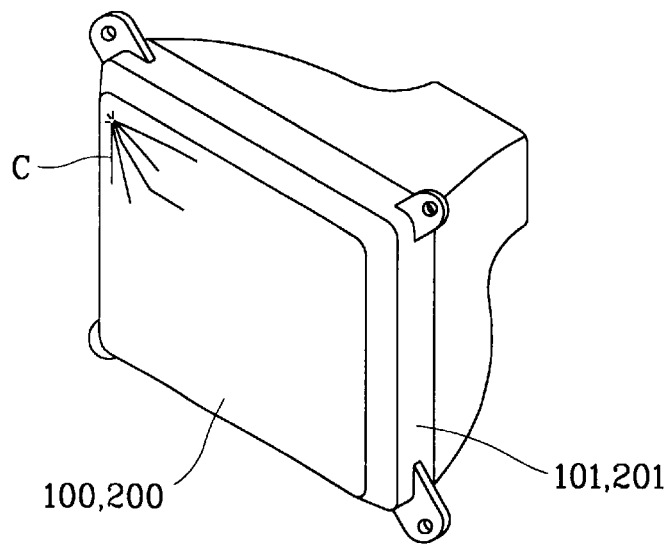
Figure 9C:
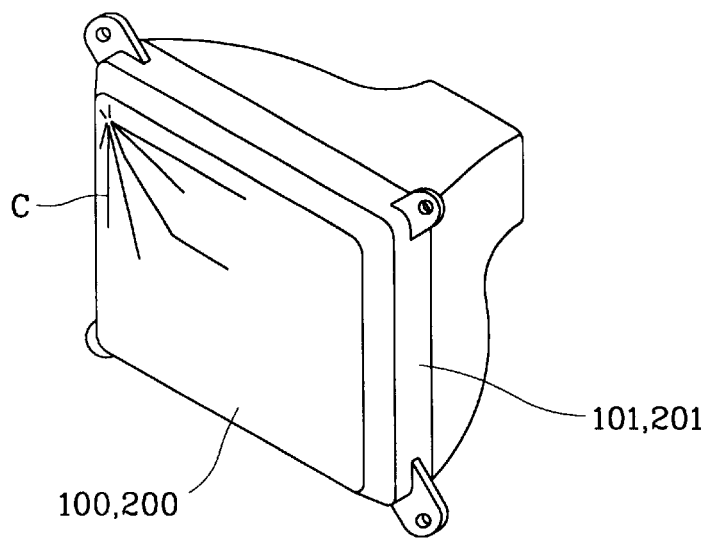
Figure 9D:
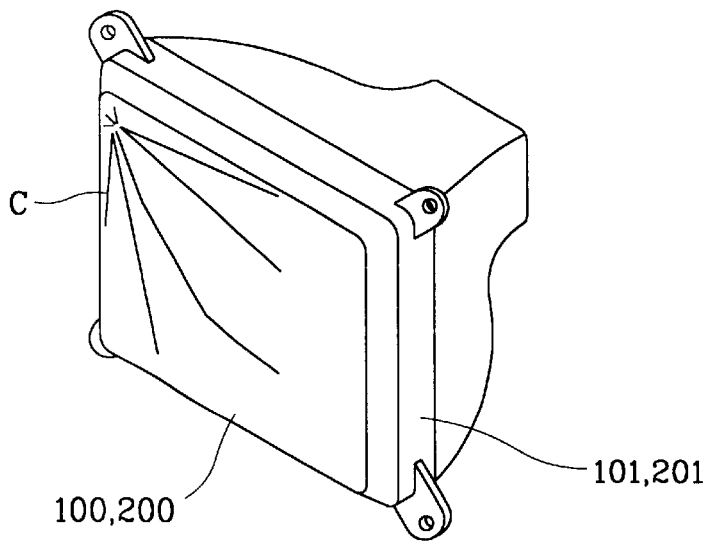
Figure 9E:
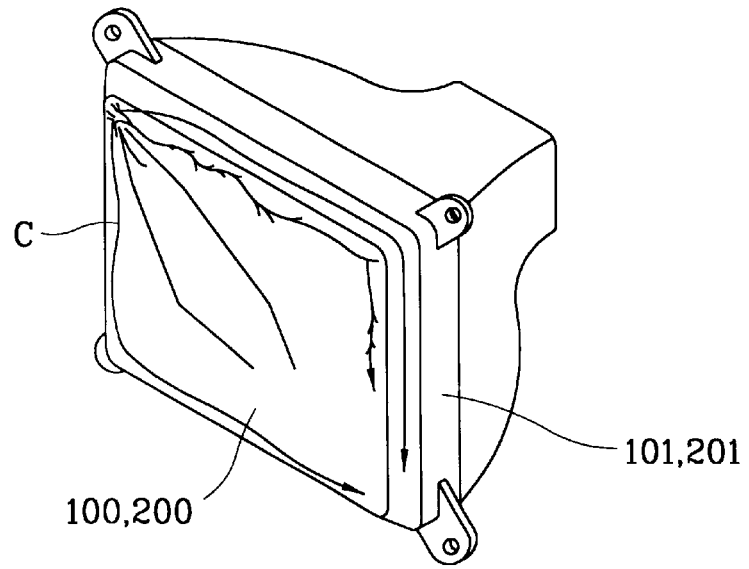
Figure 10A:
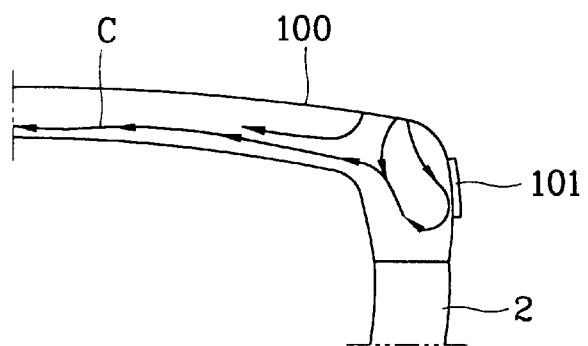
Figure 10B:
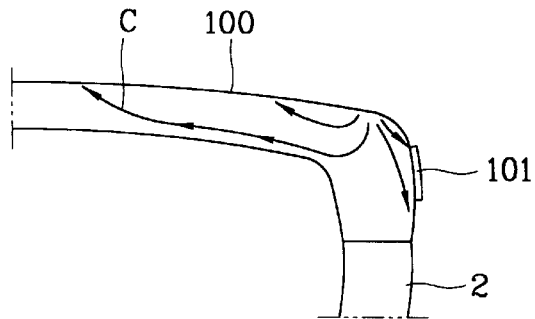
Figure 10C:
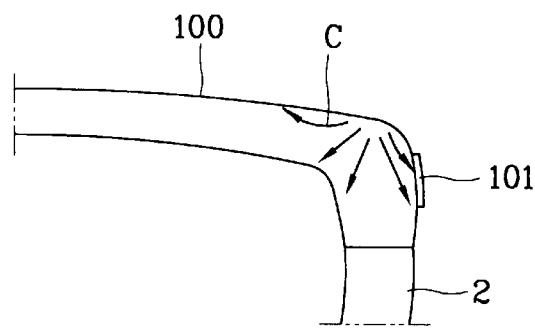
Figure 10D:
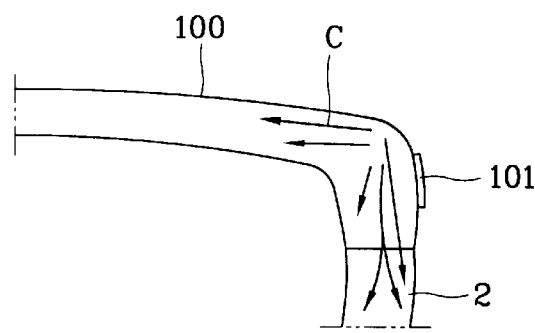
Figure 11A:
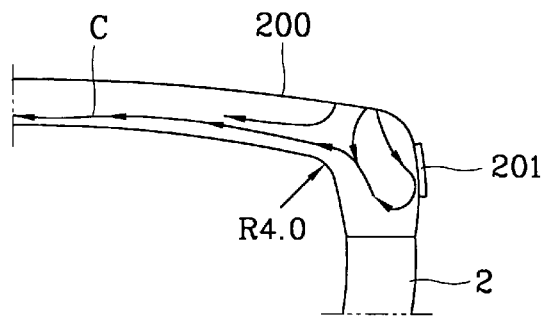
Figure 11B:
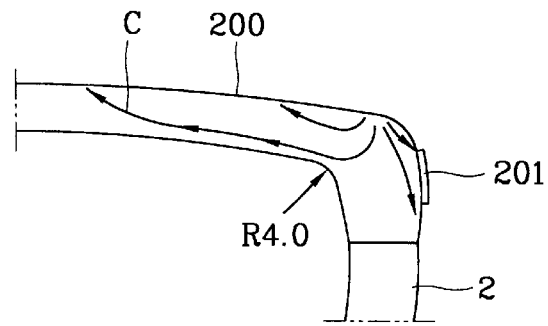
Figure 11C:
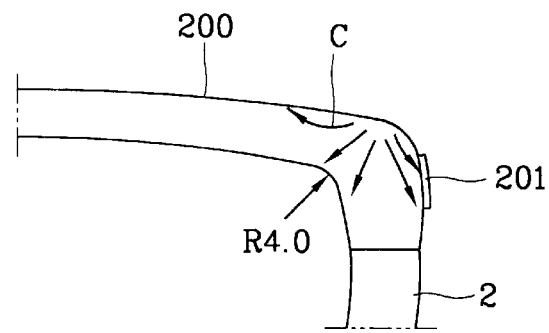
Figure 11D:
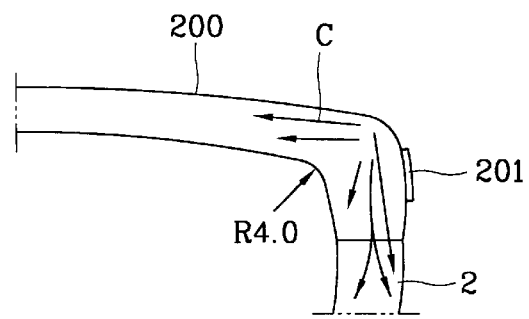

FIG. 8 illustrates a panel ball impact test for measuring the strength of the panel 1, 100, 200 by dropping a ball 10 having a certain weight on the surface of the panel 1, 100, 200 based on a varying height in a state that the panel 1, 100, 200 is fixed. It is possible to measure the strength of the panel 1, 100, 200 based on the above-described test.

As a result of the test, in the case of a 29-inche panel, the panel was broken by an impact above 5.45J of energy. In the case of a 29-inch FCD panel, the panel was broken by above 4.256J of energy. Therefore, the strength of the panel was affected by the structural shape rather than the thickness.

The panel ball impact test was continuously performed by varying the width by adapting the safety band to the 29-inch FCD panel. As a result of the test, the following result was obtained.

TABLE 4

| Width(mm) | Engaging tensile force(Kgf) | None crack | 1/4 crack | 2/4 crack | 3/4 crack | 4/4 crack |
|---|---|---|---|---|---|---|
| 63 | 4032 | 7 | 4 | 4 | 0 | 0 |
| 61 | 3904 | 7 | 6 | 2 | 1 | 0 |
| 59 | 3776 | 5 | 7 | 3 | 2 | 0 |
| 57 | 3648 | 3 | 2 | 2 | 3 | 1 |

As shown in Table 4, the band having a width above 57 mm has an anti-explosion characteristic which satisfies the UL/CSA standard, and in the case of the band having a width of 57 mm, the growth of the crack was proper on the surface of the panel. However, a lot of crack was grown in the direction of the funnel. In the case of the panel having a width of 59 mm and 61 mm, the cracks were properly grown on the surface of the panel and the funnel.

In addition, in the case of the panel having a width of 63 mm, the crack was continuously grown on the surface of the panel, and a large part of the crack was blocked for thereby resulting in a returning crack.

Therefore, the optimum width of the safety band 101 adapted to the FCD panel 100 is 59 mm~61 mm.

FIGS. 9A through 9E illustrate various shapes of cracks.

In addition, it is possible to obtain an optimum bend portion width based on the entire width of the safety band 101.

In Table 5, the growing state of the cracks is checked by changing the bent portion width based on the width of the safety band 101.

TABLE 5

| Width(mm) | Bent portion width(mm) | None crack | 1/4 crack | 2/4 crack | 3/4 crack | 4/4 crack |
|---|---|---|---|---|---|---|
| 63 | 15 | 2 | 3 | 2 | 3 | 3 |
| 63 | 19 | 2 | 2 | 1 | 3 | 0 |
| 63 | 22 | 3 | 3 | 2 | 1 | 0 |
| 63 | 24 | 3 | 0 | 1 | 0 | 0 |
| 61 | 22 | 7 | 3 | 2 | 0 | 0 |
| 61 | 24 | 2 | 2 | 0 | 0 | 0 |
| 59 | 22 | 4 | 4 | 3 | 0 | 0 |
| 59 | 24 | 1 | 2 | 1 | 0 | 0 |
| 57 | 15 | 0 | 3 | 2 | 1 | 0 |
| 57 | 19 | 1 | 2 | 2 | 0 | 0 |
| 57 | 22 | 2 | 1 | 1 | 0 | 0 |

As shown in Table 5, the anti-explosion characteristic is changed based on the engaging center of the safety band 101. When the bent portion of the safety band is wider, it is advantageous. A proper adjustment is needed based on the tensile ratio with respect to the entire width.

As shown in FIGS. 10A through 10D, in the case of the panel having an entire width of 63 mm and a bent portion width of 15 mm, the front end tensile force was smaller compared to the read end portion tensile force. Therefore, the crack "c" did not grow in the direction of the funnel 2 and returned back to the surface of the panel 100 for thereby causing a returning crack. Therefore, the crack "c" was widely spread on the entire surface of the panel 100. In the case of the panel having the entire width of 63 mm and the bent portion width of 19 mm, the front end tensile force was increased by 6%, and the returning crack "c" is partially formed. In the case of the panel having the entire width of 63 mm and the bent portion widths of 22 mm and 24 mm, the front end tensile force was increased by 11%~14%, and the growth of the returning crack "c" was fully prevented.

The dimension of the safety band 101 is limited to the case that the 29-inch FCD panel is adapted. When adapting to various models, in the case that the ratio of the entire width and the bent portion width of the safety band 101 is below 30.16%, the front end tensile force is too small, so that it is impossible to fully overcome the tensile force concentrated on the corner portion and peripheral portion of the panel. In this case, since the rear end tensile force is too large, the cracks and returning cracks are continuously grown, for example, for 10 minutes, along the mold match line of the side wall portion of the panel, and a plurality of small particles are formed in the forward direction, so that the CRT is broken.

In the case that the ratio of the entire width and the bent portion width of the safety band 101 is 30.16%~41.27%, it is possible to obtain a certain stability by preventing the crack from being grown within a certain time of 20 seconds from the impact point of the panel by properly distributing the tensile force formed in the panel based on the compression force of the safety band.

In the case that the ratio of the entire width and the bent portion width of the safety band 101 is above 41.27%, the rear end tensile force is too small, and the crack is quickly grown in the direction of the funnel 2 for thereby causing an explosion state of the funnel, and the particles of the same collide with the inner surface of the panel resulting in a secondary crack.

Assuming that the entire width of the safety band 101 is W, and the bent portion width is D, it is possible to implement a good cost-based reliability based on an expression of inequality of $30.16(\%) \leq D/W \times 100 \leq 41.27(\%)$.

Figure 12:
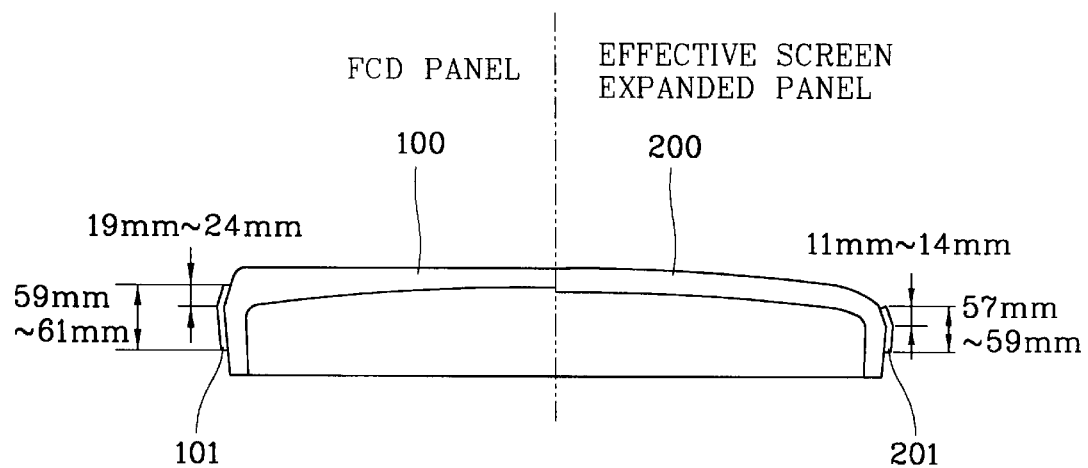
FIG. 12 is a view illustrating a dimension of a safety band adapted to a FCD panel and an effective screen expanded panel according to the present invention.

As shown in FIG. 12, more preferably, the optimum width of the safety band adapted to the FCD panel 100 is 59 mm in the entire width and 24 mm in the bent portion width. In addition, assuming that the entire width of the safety band 101 is W, and the bent portion width is D, an expression of inequality of $31.15(\%) \leq D/W \times 100 \leq 40.68(\%)$ is obtained.

In another embodiment of the present invention, the dimension of the safety band 201 adapted to the effective screen expanded panel 200 is optimized.

Recently, the expanded screen CRT which has the increased screen size and the flat screen is fabricated. In addition, the effective screen in the same size is increased.

In the effective screen expanded CRT, the panel having the expanded effective screen is adapted. In order to expand the effective screen, the size of the inner surface of the panel must be increased.

In order to provide the strength of the conventional panel 1, the curvature of the corner portion is above R8(8 mm). In the case of the effective screen expanded panel 200, since the curvature radius of the inner diagonal portion of the corner portion is below R4(4 mm), there are much weak points compared to the conventional panel 1.

Namely, since the curvature of the inner corner portion of the panel 200 is small, the stress is formed at the corner portion. Therefore, the corner portion is very weak. As shown in the following Table 6, the maximum stress during the vacuum and reinforcing operation is low compared to the conventional panel 1.

TABLE 6

| | Conventional panel | Effective screen expanded panel | Max stress increase(%) |
|---|---|---|---|
| Max stress in vacuum state | 77.13 Kgf/cm$^2$ | 95.21 Kgf/cm$^2$ | 23.44 |
| Max stress in Reinforcing state | 67.83 Kgf/cm$^2$ | 83.41 Kgf/cm$^2$ | 22.97 |

The panel ball impact test was performed by changing the width by adapting the safety band 201 to the effective screen expanded panel 200 having a curvature of the inner corner portion of below R4(4 mm). As a result of the test, the following result of Table 7 was obtained.

TABLE 7

| | Engaging | Result | | | | |
|---|---|---|---|---|---|---|
| Width(mm) | tensile force(Kgf) | None crack | 1/4 crack | 2/4 crack | 3/4 crack | 4/4 crack |
| 60 | 3840 | 5 | 2 | 1 | 2 | 1 |
| 57 | 3648 | 10 | 11 | 4 | 3 | 2 |
| 56 | 3584 | 11 | 12 | 3 | 1 | 2 |
| 54 | 3456 | 4 | 5 | 2 | 2 | 5 |

As shown in Table 7, in the safety band having a width above 56 mm, a desired anti-explosion characteristic which satisfies the UL/CSA was obtained. In the case of the width of 56 mm, the tensile force was too small to effectively distribute the stress concentrated at the corner portion. In the case of the safety band having a width of 57 mm, a proper amount of the cracks "c" was obtained on the surfaces of the panel 200 and at the funnel 2.

In the case of the safety band having a width of 60 mm, the cracks "c" were continuously formed due to the over tensile force. The cracks growing in the direction of the funnel 2 were effectively prevented because the rear end tensile force was larger than the front end tensile force. In this case, the returning cracks "c" were obtained.

Therefore, the optimum width of the safety band 201 adapted to the effective screen expanded panel 200 was 57 mm~59 mm.

It is possible to obtain an optimum bent portion width based on the width of the safety band 201.

The following Table 8 illustrates a growing state of the crack "c" by changing the bent portion width based on the width of the safety band 201.

TABLE 8

| | Bent | Result | | | | |
|---|---|---|---|---|---|---|
| Width(mm) | portion width(mm) | None crack | 1/4 crack | 2/4 crack | 3/4 crack | 4/4 crack |
| 60 | 8 | 4 | 6 | 2 | 1 | 3 |
| 60 | 10 | 1 | 9 | 3 | 3 | 1 |
| 60 | 11 | 2 | 4 | 3 | 3 | 1 |
| 57 | 10 | 10 | 9 | 3 | 2 | 0 |
| 57 | 12 | 10 | 16 | 8 | 3 | 1 |
| 56 | 10 | 8 | 11 | 4 | 1 | 1 |
| 56 | 12 | 4 | 5 | 4 | 1 | 0 |
| 54 | 10 | 4 | 3 | 1 | 2 | 6 |

As shown in Tables 8 and FIG. 11, in the case of the safety band having the entire width of 60 mm and the bent portion width of 8 mm, the front end tensile force is small compared to the rear end portion tensile force. Therefore, the cracks "c" were not grown in the direction of the funnel 2 and were returned to the surface of the panel 200 for thereby forming the returning cracks "c". Therefore, the cracks "c" were spread on the entire surface of the panel 200. In the case of the safety and having the entire width of 60 mm, the bent portion width of 10 mm and 11 mm, the front end tensile force was increased by about 3.3%~5%. In this case, the returning cracks "c" were partially formed. In the case of the safety band having the entire width of 60 mm and the bent portion width of 12 mm, the front end portion tensile force was increased by 7.7%. In this case, the returning cracks "c" were effectively prevented.

The above-described dimension of the safety band 201 is adapted to the 33-inch CPT panel. When the safety band 201 is adapted to various models, in the case that the ratio of the entire width and the bent portion width of the safety band 201 is below 17.86%, the front end tensile force was too small. Therefore, the tensile stress concentrated at the corner portion and peripheral portion of the panel was not effectively prevented. In addition, since the rear end tensile force is too large, the cracks and returning cracks are increasingly grown along the mold match line 202 of the side wall portion of the panel as the time is elapsed(for more than 5 minutes). The front face portion of the panel are broken down, and the CRT is broken.

In the case that the ratio of the entire width and the bent portion width of the safety band 201 is 17.86%~25.00%, the tensile stress force that is generated as the compression force of the safety band is applied to the safety band is properly distributed, and the growing cracks are prevented within a certain time(for example, within 20 seconds) from the impact point of the panel for thereby obtaining a certain stability of the CRT In addition, in the case that the ratio of the entire width and the bent portion width of the safety band 201 is above 25.00%, the rear end portion tensile force is too small, so that the cracks are quickly grown in the direction of the funnel 2. Therefore, an explosion phenomenon occurs in the CRT.

Assuming that entire width of the safety band 201 is W, and the bent portion width is D, an expression of inequality of $18.64(\%) \leq D/W \times 100 \leq 24.56(\%)$ is obtained, so that it is possible to decrease the cost and increase the reliability of the product.

More preferably, as shown in FIG. 12, the optimum bent portion width with respect to the optimum width of 57 mm~59 mm of the safety band 201 adapted to the effective screen expanded panel 200 is 11 mm~14 mm.

In addition, assuming that the entire width of the safety band 201 is W, and the bent portion width of the same is D, an expression of inequality of $17.64(\%) \leq D/W \times 100 \leq 24.56(\%)$ is obtained.

Therefore, most preferably, the entire width W of the safety band is 57~59 mm, and the width D from the front end portion in the direction of the width to the bent portion is 11~14 mm, and an expression of inequality of $18.64(\%) \leq D/W \times 100 \leq 24.56(\%)$ is obtained.

When optimizing the dimensions of the safety band 101, 201 adapted to the FCD panel 100 and the effective screen expanded panel 200, a proper width of the safety band is important. In addition, a proper bent portion width is important.

Figure 13:
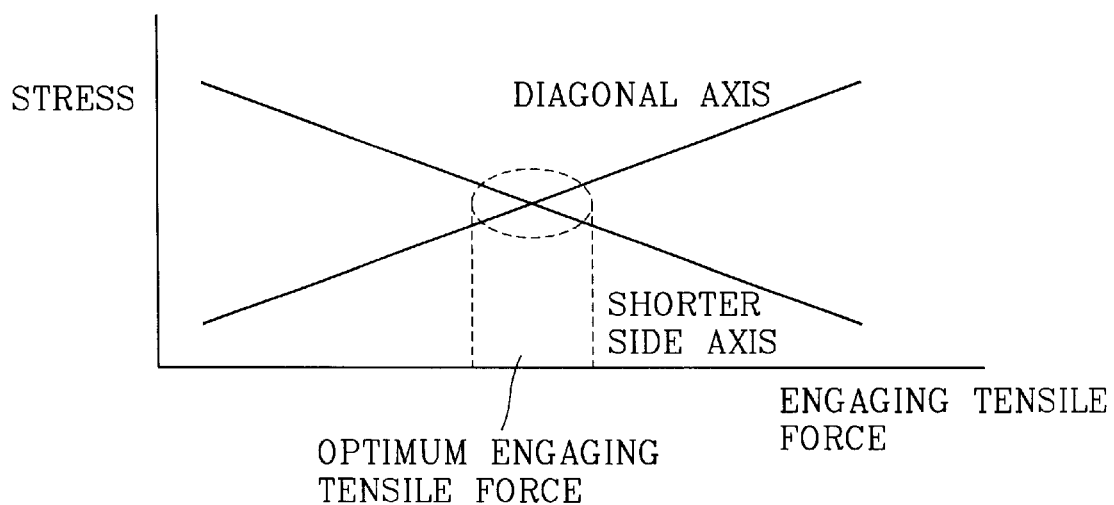
FIG. 13 is a view illustrating an interrelationship between an engaging tensile force and a stress according to the present invention.

When determining the engaging tensile force of the safety band 101, 201, as shown in FIG. 13, in the case that the tensile force of the safety band is increased, the stress in the diagonal direction is increased. In this case, the stress of the shorter side of the panel is decreased. The optimum engaging tensile force must be determined at a portion in which the diagonal axis and the shorter side axis meet. The above-described optimum engaging tensile force is obtained based on the entire width, bent portion width, and the engaging position.

As described above, in the present invention, it is possible to provide a safety band having an optimum dimension adapted to the FCD panel or the effective screen expanded panel, so that it is possible to obtain a market compatibility based on the UL/CSA standard by enhancing an anti-explosion characteristic of each panel and obtaining a stability of use. In addition, it is possible to obtain a low cost and high efficiency safety band based on a straight line type band.

As the present invention may be embodied in several forms without departing from the spirit or essential characteristics thereof, it should also be understood that the above-described embodiment is not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. In a CRT(Cathode Ray Tube) including a panel having an outer flat surface and an inner surface having a certain curvature, and a safety band bent at a mold match line of a side wall portion of the panel and continuously surrounding a side wall portion of the panel in the lengthy direction, a CRT safety band which satisfies an expression of inequality of $30.16(\%) \leq D/W \times 100 \leq 41.27(\%)$ where W represents the entire width, D represents a width from a front end portion in the width direction to the bent portion.

2. A CRT safety band of claim 1, wherein said safety band has an entire width of 59~61 mm and a width D of 19~24 mm from the front end portion in the width direction to the bent portion and satisfies an expression of inequality of $31.15(\%) \leq D/W \times 100 \leq 40.68(\%)$.

3. In a CRT(Cathode Ray Tube) which includes a panel having a curvature radius of below 4 mm of an inner surface diagonal portion which is a corner portion, and a safety band bent at a mold match line of a side wall portion of the panel and continuously surrounding a side wall portion of the panel in the lengthy direction, a CRT safety band which satisfies an expression of inequality of $17.86(\%) \leq D/W \times 100 \leq 25.00(\%)$ where W represents the entire width, D represents a width from a front end portion in the width direction to the bent portion.

4. A CRT safety band of claim 1, wherein said safety band has an entire width of 57~59 mm and a width D of 11~14 mm from the front end portion in the width direction to the bent portion and satisfies an expression of inequality of $18.64(\%) \leq D/W \times 100 \leq 24.56(\%)$.

* * * * *